United States Patent [19]

Libit

[11] Patent Number: 4,987,685
[45] Date of Patent: Jan. 29, 1991

[54] FOLDABLE ACCOUNTING GUIDE

[76] Inventor: Jeanne E. Libit, 2119 C. North Monroe St., Arlington, Va. 22207

[21] Appl. No.: 475,798

[22] Filed: Feb. 6, 1990

[51] Int. Cl.⁵ .............................................. B43L 7/06
[52] U.S. Cl. ..................................... 33/478; 33/1 K; 33/458
[58] Field of Search ................ 33/1 K, 1 C, 1 G, 1 B, 33/403, 483, 493, 495, 496, 478, 480, 474, 2, 458, 755, 1 BB; 434/109

[56] References Cited

U.S. PATENT DOCUMENTS

| | | | |
|---|---|---|---|
| 396,099 | 1/1989 | Lutz | 33/458 |
| 4,565,012 | 1/1986 | Bilodeau et al. | 33/458 |
| 4,674,192 | 6/1987 | Libit | 33/478 X |

FOREIGN PATENT DOCUMENTS 681753  2/1930  France ................................. 33/480

*Primary Examiner*—Harry N. Haroian
*Attorney, Agent, or Firm*—Fleit, Jacobson, Cohn, Price, Holman & Stern

[57] ABSTRACT

A guide having a unique folding construction which enables the guide to have all of its components oriented in a straight line condition or enabling the end components to be oriented in perpendicular relation through a novel hinge structure at the juncture between the two end components. The hinge structure includes a triangular rigid component that is connected to the end components by a hinge structure having angularly disposed hinge axes between a triangular connecting member and two end components so that the end components can be oriented in perpendicular relation, in overlying relation or in longitudinal alignment. The foldable guide device may be used for various purposes and is preferably constructed of transparent material and provided with various indicia, guide lines and the like which enable it to be used for various purposes including assistance in accounting entries in a ledger or the like.

4 Claims, 1 Drawing Sheet

FIG. 1
FIG. 5
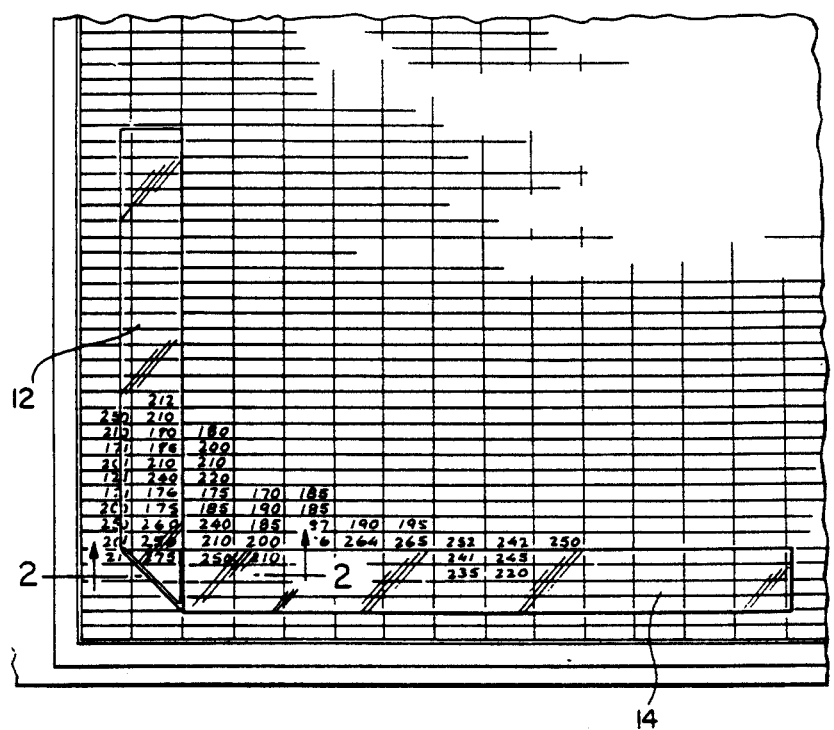
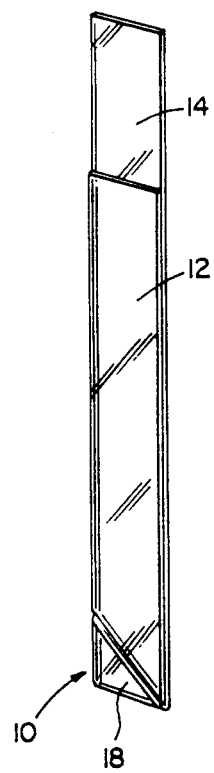
FIG. 2
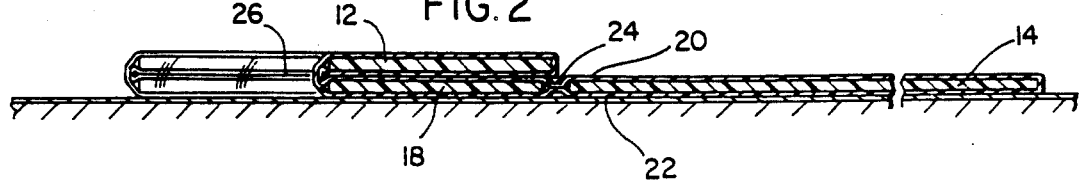
FIG. 3
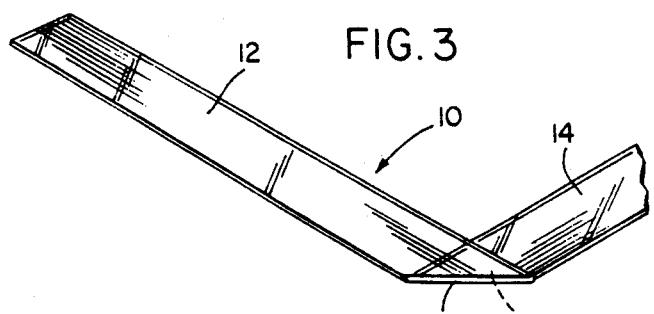
FIG. 6
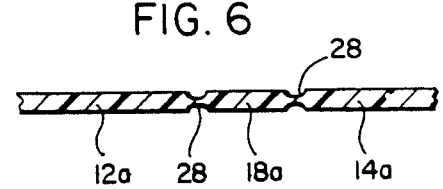
FIG. 4
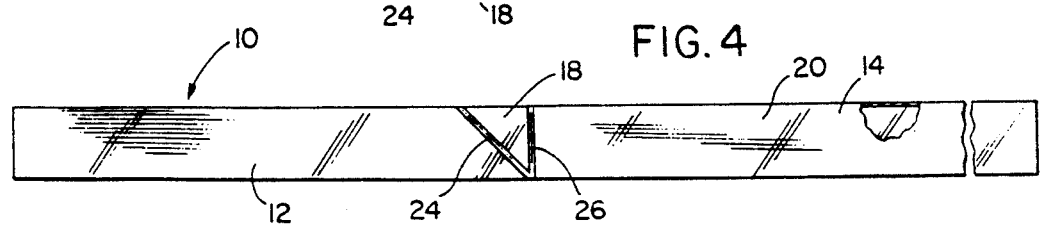

4,987,685

FOLDABLE ACCOUNTING GUIDE

BACKGROUND OF THE INVENTION

1. Field of the Invention

The present invention generally relates to an accounting guide and more particularly to a guide having a unique folding construction which enables the guide to have all of its components oriented in a straight line condition or enabling the end components to be oriented in perpendicular relation through a novel hinge structure at the juncture between the two end components. The hinge structure includes a triangular rigid component that is connected to the end components by a hinge structure having angularly disposed hinge axes between a triangular connecting member and two end components so that the end components can be oriented in perpendicular relation, in overlying relation or in longitudinal alignment. The foldable guide device may be used for various purposes and is preferably constructed of transparent material and provided with various indicia, guide lines and the like which enable it to be used for various purposes including assistance in accounting entries in a ledger or the like.

2. Information Disclosure Statement

Prior Pat. No. 4,674,192 issued June 23, 1987 for Accounting Guide discloses a transparent guide for use in assisting accountants in various entries in ledgers and the like. The device disclosed in that patent is in the form of an L-shaped member having two components oriented in perpendicular relation and provided with indicia, translucent areas and an opening to facilitate entry of information into the ledger sheets and the like. However, the structure in that patent and the prior art of record in that patent is not the same as nor equivalent to the structure of this invention.

SUMMARY OF THE INVENTION

An object of the present invention is to provide a foldable guide in which two components are interconnected by a hinge structure which enable the two components to be oriented in longitudinal alignment for use as a straight edge guide and in perpendicular relation for use as a guide in relation to columns of figures and other similar uses.

Another object of the invention is to provide a foldable guide in which the hinge structure connecting the end components in one embodiment is of triangular configuration with all three components being interconnected by laminated flexible plastic sheet material with the flexible plastic juncture between the rigid components providing hinge axes in angular relation to the longitudinal center line of the components thereby enabling the components to be oriented in alignment or in perpendicular relation for various uses.

Still another object of the invention is to provide a foldable guide in which the hinge structure connecting the end components in another embodiment is of triangular configuration with all three components being interconnected by integral plastic hinge structures providing hinge axes in angular relation to enable the components to be oriented in alignment or in perpendicular relation.

A further object of the invention is to provide a foldable guide of transparent construction and capable of having various indicia inscribed or formed thereon to enable the guide to be used for various purposes with the folding characteristics of the guide enabling it to be more easily stored for use and more easily deployed when being used.

These together with other objects and advantages which will become subsequently apparent reside in the details of construction and operation as more fully hereinafter described and claimed, reference being had to the accompanying drawings forming a part hereof, wherein like numerals refer to like parts through-out.

BRIEF DESCRIPTION OF THE DRAWINGS

FIG. 1 is a plan view of the foldable guide device of the present invention illustrating its association with a ledger sheet.

FIG. 2 is a detailed sectional view of the hinge construction between the end components.

FIG. 3 is a plan view illustrating the perpendicular position of the end components.

FIG. 4 is a plan view illustrating the components in longitudinal alignment.

FIG. 5 is a perspective view illustrating the end components in overlying relation.

FIG. 6 is a sectional view of a second embodiment of guide illustrating an integral plastic hinge structure.

DESCRIPTION OF THE PREFERRED EMBODIMENT

Referring now specifically to FIGS. 1-5 of the drawings, the foldable guide of the present invention is generally designated by reference numeral 10 and includes a pair of end components 12 and 14 and a hinge assembly generally designated by reference numeral 16 which interconnects the end components 12 and 14 to enable all of the components to be oriented in longitudinal alignment or the components 12 and 14 being oriented in perpendicular relation. The components including the hinge structure are preferably constructed of transparent plastic material capable of receiving various guide lines, indicia and the like printed or otherwise formed thereon to enable the guide to be used for various purposes.

The hinge structure 16 includes a generally rigid triangular member 18 having dimensions similar to the dimensions of the end components 12 and 14 insofar as width and thickness is concerned. The components 12, 14 and 18 are interconnected by plastic film or sheeting 20 and 22 of polyester which extend along the top and bottom surfaces of the components with the film or sheeting 20 and 22 being laminated to the components 12, 14 and 18 and being laminated to each other in the areas between the components 12 and 18 and 14 and 18 as designated by numerals 24 and 26 which define hinge axes between the components 12, 18, 14 with hinge axis 24 being angularly disposed at 45° in relation to the longitudinal axis of the components 12, 18 and 14 and the hinge axis 26 being perpendicular to the longitudinal axis of the components 12, 18 and 14 when these components are in alignment as illustrated in FIG. 4.

The components 12, 18 and 14 can be used as a straight edge when the components are in alignment and these components could be used as a guide in the form of a right angle square when the components 12 and 14 are in perpendicular relation to each other and the hinge construction has been pivoted about selected axes 24 and 26 with the triangular member 18 oriented in one of two positions in relation to the two components 12 and 14. When the components 12 and 14 are oriented in perpendicular relation to each other, the device is especially useful as a guide in making accounting entries or observing accounting entries so that the entries that are oriented horizontally and vertically can be more readily distinguished and accurately designated or observed.

The components 12, 14 and 18 of the guide are constructed of transparent plastic material such as polyethylene and the like thereby assuring that the guide can be constructed with minimum cost but with maximum utility since the guide can be easily folded so that the components overlie each other in alignment as shown in FIG. 5 but yet can be easily oriented in extended aligned condition or in extended perpendicular condition as shown in FIG. 3. Various guidelines of distinguishable colors and other indicia such as graduated scales and the like can be positioned along the edges or on the central portions of the components. The width of the components may vary but primarily they are constructed to conform with the dimensions of the horizontal rows and vertical columns on existing ledger sheets, journals and the like.

FIG. 6 illustrates another embodiment of the invention in which the components 12a, 18a and 14a are of unitary construction and opposed grooves 28 are formed in the plastic material to form angularly related hinge axes arranged and functioning in the same manner as the embodiment in FIGS. 1-5. The opposed grooves 28 form "living" hinges between the adjacent components.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A guide comprising a pair of elongated, narrow, thin strip-like components constructed of flexible, resilient, stiff material, a transverse hinge means interconnecting adjacent ends of the components enabling the components to be pivoted about an axis perpendicular to the components to enable the components to be oriented in alignment and extended end-to-end relation and in alignment and overlying superimposed relation and an angular hinge means forming a hinge axis at 45° in relation to the longitudinal axis of the components with one end of the angular hinge means intersecting the transverse hinge means at one end thereof with the other end of the angular hinge means terminating in spaced relation to the other end of the transverse hinge means to form a triangular member between the hinge means which can pivot to positions overlying and underlying a triangular portion of an adjacent end portion of each component and pivot to a position with the triangular member sandwiched between triangular portions of adjacent end portions of said components to enable the components to be oriented in perpendicular relation, said triangular member having a width and thickness equal to the width and thickness of the strip-like components.

2. The structure as defined in claim 1 wherein the width of each said components is commensurate with the width of columns in a ledger sheet, journal and the like.

3. The structure as defined in claim 1 wherein each of said hinge means includes flexible plastic sheeting of polyester film laminated to the components.

4. The structure as defined in claim 1 wherein each of said hinge means is unitary with said components with said hinge axes being defined by opposed grooves formed in the plastic material to form "living" hinges between the components.

* * * * *